United States Patent
Yu

(10) Patent No.: US 10,186,275 B2
(45) Date of Patent: Jan. 22, 2019

(54) SHARING METHOD AND DEVICE FOR VIDEO AND AUDIO DATA PRESENTED IN INTERACTING FASHION

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventor: Fei-Fan Yu, New Taipei (TW)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 15/475,147

(22) Filed: Mar. 31, 2017

(65) Prior Publication Data

US 2018/0286421 A1 Oct. 4, 2018

(51) Int. Cl.
| | |
|---|---|
| *G06F 17/00* | (2006.01) |
| *G10L 21/02* | (2013.01) |
| *H04N 21/81* | (2011.01) |
| *G10L 15/08* | (2006.01) |
| *G10L 25/57* | (2013.01) |
| *G11B 20/10* | (2006.01) |

(52) U.S. Cl.
CPC .......... *G10L 21/0202* (2013.01); *G10L 15/08* (2013.01); *G10L 25/57* (2013.01); *G11B 20/10527* (2013.01); *H04N 21/8106* (2013.01); *G10L 2015/088* (2013.01); *G11B 2020/10546* (2013.01)

(58) Field of Classification Search
CPC ..... G10L 21/0202; G10L 15/08; G10L 25/57; H04N 21/8106; G11B 20/10527; G11B 2020/10546
See application file for complete search history.

(56) References Cited

U.S. PATENT DOCUMENTS

| | | | |
|---|---|---|---|
| 2009/0147009 A1 | 6/2009 | Tanaka et al. | |
| 2010/0023485 A1* | 1/2010 | Cheng Chu | G06F 17/30026 707/E17.014 |
| 2010/0278453 A1* | 11/2010 | King | G06Q 10/10 382/321 |

(Continued)

FOREIGN PATENT DOCUMENTS

| | | |
|---|---|---|
| CN | 1933559 A | 3/2007 |
| CN | 101268494 A | 9/2008 |

*Primary Examiner* — Andrew C Flanders
(74) *Attorney, Agent, or Firm* — ScienBiziP, P.C.

(57) ABSTRACT

A sharing method for video and audio data presented in an interacting manner applies to story-telling. The story from a book or other source includes a plurality of preset sentences, each having a plurality of keywords and which correspond to a preset video frame. The keywords represent roles and non-roles, and each of the roles corresponds to an image. Voice sources of the roles of the story are set according to a user instruction. Audio data of storytelling is matched with the keywords of the preset sentences, wherein the audio data is acquired from the voice sources. A matched sentence is acquired from the preset sentences. The preset video frame corresponding to the matched sentence is selected and displayed for vividness of presentation.

21 Claims, 2 Drawing Sheets

(56) References Cited

U.S. PATENT DOCUMENTS

2010/0324902 A1* 12/2010 Kurzweil ............... G09B 5/062
                                                704/260
2014/0349259 A1* 11/2014 Ingrassia, Jr. ........ G09B 17/003
                                                434/169

* cited by examiner

SHARING METHOD AND DEVICE FOR VIDEO AND AUDIO DATA PRESENTED IN INTERACTING FASHION

FIELD

The subject matter herein generally relates to video and audio processing technology.

BACKGROUND

Stories can be presented by audio books or storytelling machines. Parents can also read the stories for children. The audio books and storytelling machines lack parent-child interactions. Heading stories for children makes parent-child interactions frequent, but a lack of a variety in roles, tone, and sound may make storytelling process boring.

BRIEF DESCRIPTION OF THE DRAWINGS

Implementations of the present technology will now be described, by way of example only, with reference to the attached figures, wherein.

DETAILED DESCRIPTION

Figure 1:
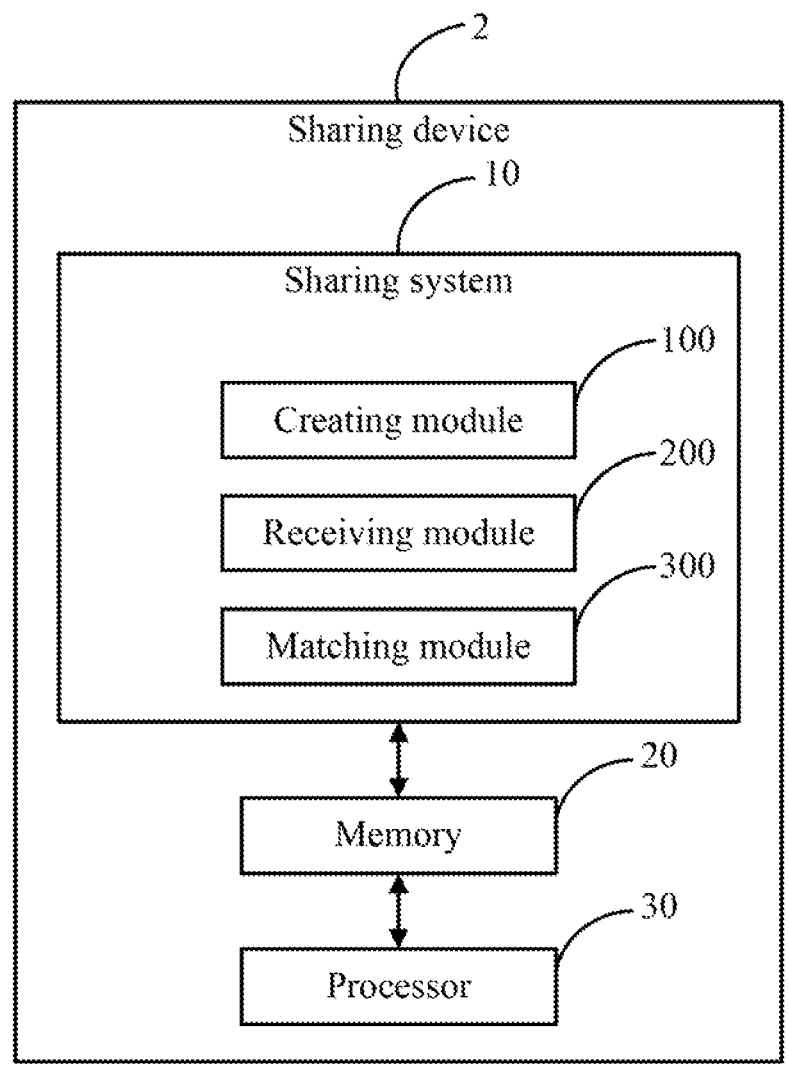
FIG. 1 illustrates a block diagram of an embodiment of a sharing device for vivid presentation of video and audio data.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

References to "an" or "one" embodiment in this disclosure are not necessarily to the same embodiment, and such references mean "at least one."

In general, the word "module" as used hereinafter, refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

FIG. 1 illustrates a sharing device 2 for video and audio data which interact in the embodiment, the sharing device 2 includes a sharing system 10, a memory 20, and a processor 30. The sharing device 2 may be one or more devices, such as one or any combination of set-top boxes and smart TVs, phones, or tablets.

The sharing system 10 includes one or more function modules. The one or more function modules can include computerized code in the form of one or more programs that are stored in the memory 20, and executed by the processor 30 to provide functions of the sharing system 10. The memory 20 can be a dedicated memory, such as an EEPROM or a flash memory.

In an embodiment, the sharing system 10 includes a creating module 100, a receiving module 200, and a matching module 300. The functions of the modules 100-300 are described with reference to FIG. 2.

Figure 2:
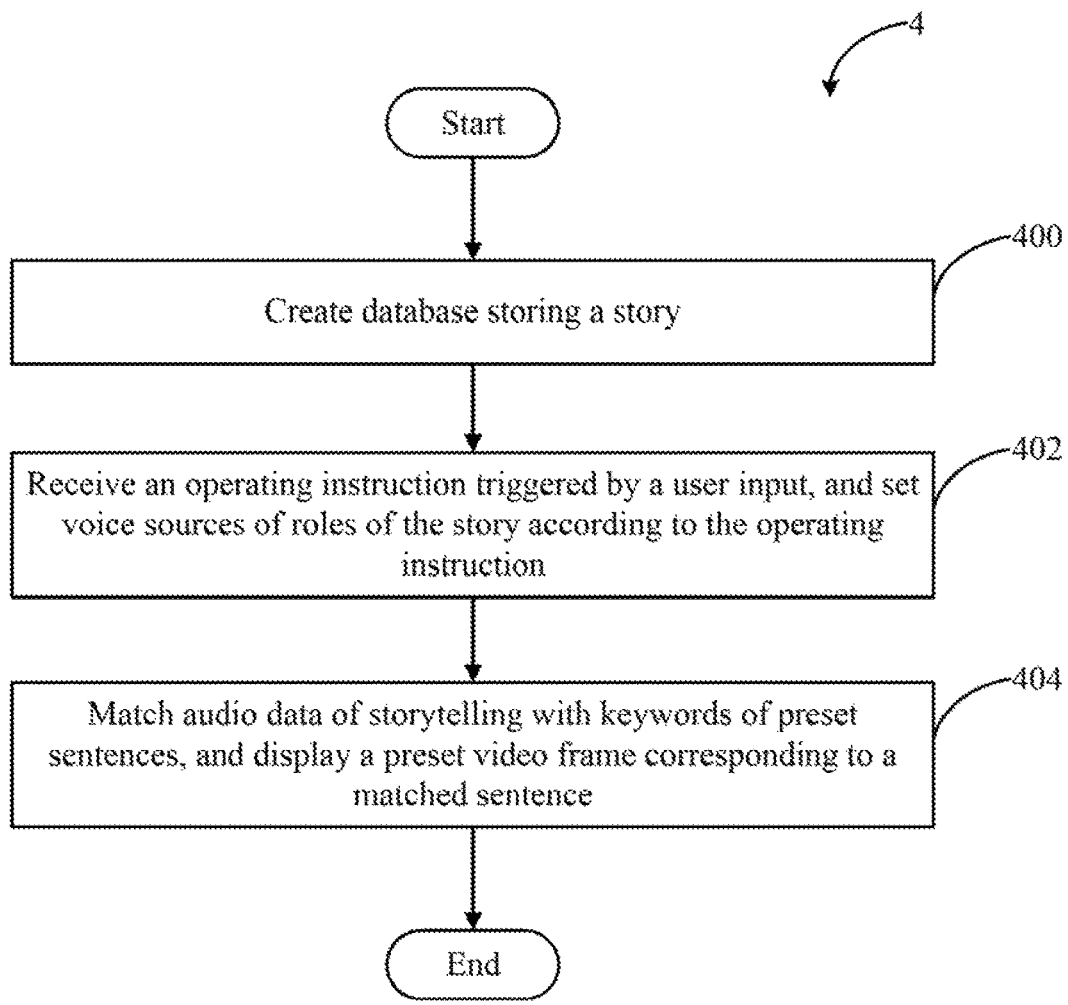
FIG. 2 illustrates a flowchart of an embodiment of a sharing method for vividly-presented video and audio data.

Referring to FIG. 2, a flowchart is presented in accordance with an example embodiment of a sharing method 4 for interacting video and audio data. The sharing method 4 is provided by way of example, as there are a variety of ways to carry out the method. The sharing method 4 described below can be carried out using the configurations illustrated in FIG. 1, for example, and various elements of this figure are referenced in explaining the sharing method 4. Each block shown in FIG. 2 represents one or more processes, methods, or subroutines, carried out in the exemplary sharing method 4. Additionally, the illustrated order of blocks is by example only and the order of the blocks can change. The sharing method 4 can begin at block 400.

At block 400, the creating module 100 creates database storing a story.

In the embodiment, the story includes a plurality of preset sentences. Each of the preset sentences includes a plurality of keywords and corresponds to a preset video frame. The keywords may represent roles (e.g., Harry Potter or Hermione) and non-roles (e.g., Hagrid's lodge or forbidden forest). The story includes a plurality of roles. Each of the roles is corresponding to an image and a preset voice. The preset video frame includes foreground images, background images, the preset voices, and sound effects. The foreground images are the images associated with the role.

In addition to original roles of the story, the roles also include user-defined roles, for replacing the original roles. The images of the user-defined roles are user-defined images uploaded by the user, such as photos of a person.

At block 402, the receiving module 200 receives an operating instruction triggered by a user input, and sets voice sources of the roles of the story according to the operating instruction.

In the embodiment, each of the roles (including a narrating personality) of the story is corresponding to a voice source. The voice source includes a voice of a user, a voice of other user invited online, the preset voice of the role, or an audio file shared from social groups, and so on.

For example, if the selected story is entitled "Harry Potter", a local user A (the father) can offer the voice of Harry Potter, a local user B (a daughter) can offer the voice of Hermione, a remote user C (the mother) invited online can offer the voice of Ronald Weasley, the audio file shared from social groups can offer the voice of Hagrid, and the narrator of the story can be the preset voice.

At block 404, the matching module 300 matches audio data of storytelling with the key words of the preset sentences, and displays the preset video frame corresponding to a matched sentence.

The audio data is acquired from the voice sources of the roles of the story. The audio data include the voices of the sources speaking for the roles, such as the voices of the user A, B, and C, the audio file shared from social groups corresponding to Hagrid, and the preset voice corresponding to the narrator of the story. The matching module 300 matches audio sentences of the audio data with the keywords in the preset sentences of the story, acquires the matched sentence from the preset sentences, selects the preset video frame corresponding to the matched sentence from the database and displays the preset video frames by a display (not shown in FIG. 1). If the audio sentence of the audio data has more than half of the keywords in one of the preset sentences, the preset sentence is determined as being a matched sentence. Then the matching module 300 displays the preset video frame corresponding to the matched sentence.

For example, the preset sentence from the story is "Harry, Hermione, and Ronald go to Hagrid's lodge to find Hagrid", wherein the keywords are "Harry Potter", "Hermione" "Ronald", "Hagrid's lodge", and "Hagrid". If the audio sentence is "Harry, Hermione and Ronald go to forbidden forest to find Hagrid", wherein the keywords "Harry", "Hermione", "Ronald", and "Hagrid" are the same as in one of the preset sentences, the preset sentence is determined as being the matched sentence and tire preset video frame corresponding to the matched sentence is displayed. If the audio sentence is "Harry goes to the beach to surf", wherein only the keyword "Harry" is the same as that in the preset sentence, the preset sentence is not a matched sentence and no preset video frame is displayed.

In the embodiment, the matching module 300 records a group of similar words corresponding to each of the keywords. The similar words in the group are sorted according to usage count of the similar words. A new word is added into the group of similar words when the usage count of that word accumulates to a preset count. The similar words of the group are determined to be as the same as the corresponding keyword in the preset sentences. For example, the group of similar words corresponding to the keywords "forbidden forest" includes "magical forest" and "dark forest". If the usage count of a new word or expression "black forest" is accumulated to the preset count, the new word "black forest" is added into the group of similar words corresponding to the keyword "forbidden forest", in the group, the similar words "magical forest", "dark forest" and "black forest" are sorted according to the usage count.

If a user requests replacement of a role, the matching module 300 distinguishes a replacement role from the audio data, acquires the role image corresponding to the replacement role from the database, updates the foreground images of preset video frame according to the role image but reserves tire background images, and creates an updated video frame. The updated video frame replaces one role of the story with the replacement role. The replacement role may be one role in the story or the user-defined role. If the audio sentence of the audio data has more than half of the keywords in one of the preset sentences, and a word in the audio sentence of the audio data which differs from each of the keywords are determined as the replacement role, the preset sentence is determined as the matched sentence. Then the matching module 300 displays the updated video frame corresponding to the matched sentence by the display.

For example, the preset sentence is "Harry, Hermione, and Ronald go to Hagrid's lodge to find Hagrid", wherein the keywords are "Harry", "Hermione", "Ronald", "Hagrid's lodge", and "Hagrid". If the audio sentence is "Harry, Hermione and Ronald go to Hagrid's lodge to find a policeman", where the keywords "Harry", "Hermione", "Ronald", and "Hagrid's lodge" are the same as those in the preset sentence, and the replacement role of "policeman" is distinguished, the preset sentence is determined as being the matched sentence. An image corresponding to the replacement role of "policeman" is acquired from the database, the image corresponding to "Hagrid" in the foreground images of preset video frames is updated by being replaced with image of "policeman" and the updated video frames corresponding to the matched sentence are displayed.

If a user requests recording the audio data, the matching module 300 determines each five audio sentences of the audio data as a preset range. If more than one of audio sentences within the preset range is matched with a preset sentence, the matching module 300 records a first sentence which has a largest number of matched keywords among the audio sentences within the preset range. For example, the audio sentences "Harry and Hermione go to find Hagrid" and "Harry, Hermione, and Ronald go to forbidden forest to find Hagrid" are both matched with the preset sentence "Harry, Hermione, and Ronald go to Hagrid's lodge to find Hagrid." The audio sentence "Harry, Hermione, and Ronald go to forbidden forest to find Hagrid" has more keywords which match, therefore the matching module 300 records the audio sentence "Harry, Hermione, and Ronald go to forbidden forest to find Hagrid." Moreover, the recorded sentences are sorted according to a sequence of the corresponding matched preset sentences in the story, to create an audio file. Thus, if there are reversed or repeated sentences when reading the story, the reversed or repeated sentences can be corrected according to the sequence of the preset sentences of the story. The matching module 300 further updates the preset voices in the preset video frame to be sourced from the audio file. For example, the matching module 300 updates the preset voice of Harry Potter to be the voice provided by the user A in the audio file.

The embodiments shown and described above are only examples. Many details are often found in the art such as the other features of a sharing system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A computer-implemented method, executable by a processor of a sharing device for interactive video and audio data, the method comprising:

storing a story in a database, wherein the story comprises a plurality of preset sentences, each of the preset sentences comprises a plurality of keywords and corresponds to a preset video frame, the keywords represent roles and non-roles, and each of the roles is corresponding to an image;

setting voice sources of the roles of the story according to an operating instruction triggered by a user input;

matching audio data of storytelling with the keywords of the preset sentences, wherein the audio data is acquired from the voice sources;

acquiring a matched sentence from the preset sentences; and selecting the preset video frame corresponding to the matched sentence from the database and displaying the preset video frame by a display;

determining one of the preset sentences as the matched sentence when an audio sentence of the audio data has more than half of the keywords of the preset sentence;

recording a group of similar words corresponding to each of the keywords, wherein the similar words in the group are sorted according to usage count of the similar words; and adding a new word into the group when the usage count of that word accumulates to a preset count.

2. The method as claimed in claim 1, wherein the roles comprise user-defined roles, and the images of the user-defined roles are user-defined images uploaded by the user.

3. The method as claimed in claim 1, wherein the voice sources comprise a voice of the user, a voice of other user invited online, a preset voice of the role, and an audio file shared from social groups.

4. The method as claimed in claim 1, wherein the similar words of the group are determined to be as the same as the corresponding keyword in the preset sentences.

5. The method as claimed in claim 1, further comprising:
distinguishing a replacement role from the audio data when the user requests replacement of a role;
acquiring the image corresponding to the replacement role from the database;
updating foreground images of corresponding preset video frame according to the image; and
creating an updated video frame.

6. The method as claimed in claim 5, further comprising:
determining one of the preset sentences as the matched sentence when the audio sentence of the audio data has more than half of the keywords of the preset sentence, and determining that a word in the audio sentence of the audio data which differs from each of the keywords as the replacement role.

7. The method as claimed in claim 1, further comprising:
when the user requests recording the audio data and more than one audio sentence of the audio data is matched with a preset sentence, recording a first sentence which has a largest number of matched keywords among the audio sentences; and
sorting the first sentence according to a sequence of the corresponding matched preset sentence in the story.

8. A non-transitory storage medium, storing a set of instructions, the set of instructions being executed by a processor of a sharing device for interactive video and audio data, to perform a method comprising:
storing a story in a database, wherein the story comprises a plurality of preset sentences, each of the preset sentences comprises a plurality of keywords and corresponds to a preset video frame, the keywords represent roles and non-roles, and each of the roles is corresponding to an image;
setting voice sources of the roles of the story according to an operating instruction triggered by a user input;
matching audio data of storytelling with the keywords of the preset sentences, wherein the audio data is acquired from the voice sources;
acquiring a matched sentence from the preset sentences; and
selecting the preset video frame corresponding to the matched sentence from the database and displaying the preset video frame by a display;

determining one of the preset sentences as the matched sentence when an audio sentence of the audio data has more than half of the keywords of the preset sentence;

recording a group of similar words corresponding to each of the keywords, wherein the similar words in the group are sorted according to usage count of the similar words; and adding a new word into the group when the usage count of that word accumulates to a preset count.

9. The non-transitory storage medium as claimed in claim 8, wherein the roles comprise user-defined roles, and the images of the user-defined roles are user-defined images uploaded by the user.

10. The non-transitory storage medium as claimed in claim 8, wherein the voice sources comprise a voice of the user, a voice of other user invited online, a preset voice of the role, and an audio file shared from social groups.

11. The non-transitory storage medium as claimed in claim 8, wherein the similar words of the group are determined to be as the same as the corresponding keyword in the preset sentences.

12. The non-transitory storage medium as claimed in claim 8, wherein the method further comprises:
distinguishing a replacement role from the audio data when the user requests replacement of a role;
acquiring the image corresponding to the replacement role from the database;
updating foreground images of corresponding preset video frame according to the image; and
creating an updated video frame.

13. The non-transitory storage medium as claimed in claim 12, wherein the method further comprises:
determining one of the preset sentences as the matched sentence when the audio sentence of the audio data has more than half of the keywords of the preset sentence, and determining that a word in the audio sentence of the audio data which differs from each of the keywords as the replacement role.

14. The non-transitory storage medium as claimed in claim 8, wherein the method further comprises:
when the user requests recording the audio data and more than one audio sentence of the audio data is matched with a preset sentence, recording a first sentence which has a largest number of matched keywords among the audio sentences; and
sorting the first sentence according to a sequence of the corresponding matched preset sentence in the story.

15. A sharing device for interactive video and audio data, the device comprising:
a processor;
memory storing instructions,
wherein the instructions are executed on the processor to cause the processor to:
storing a story in a database, wherein the story comprises a plurality of preset sentences, each of the preset sentences comprises a plurality of keywords and corresponds to a preset video frame, the keywords represent roles and non-roles, and each of the roles is corresponding to an image;
set voice sources of the roles of the story according to an operating instruction triggered by a user input;
match audio data of storytelling with the keywords of the preset sentences, wherein the audio data is acquired from the voice sources;
acquire a matched sentence from the preset sentences; and select the preset video frame corresponding to the matched sentence from the database and displaying the preset video frame by a display;

determining one of the preset sentences as the matched sentence when an audio sentence of the audio data has more than half of the keywords of the preset sentence;

recording a group of similar words corresponding to each of the keywords, wherein the similar words in the group are sorted according to usage count of the similar words; and adding a new word into the group when the usage count of that word accumulates to a preset count.

16. The device as claimed in claim 15, wherein the roles comprise user-defined roles, and the images of the user-defined roles are user-defined images uploaded by the user.

17. The device as claimed in claim 15, wherein the voice sources comprise a voice of the user, a voice of other user invited online, a preset voice of the role, and an audio file shared from social groups.

18. The device as claimed in claim 15, wherein the similar words of the group are determined to be as the same as the corresponding keyword in the preset sentences.

19. The device as claimed in claim 15, wherein the instructions executed on the processor further cause the processor to:

distinguish a replacement role from the audio data when the user requests replacement of a role;

acquire the image corresponding to the replacement role from the database;

update foreground images of corresponding preset video frame according to the image; and create an updated video frame.

20. The device as claimed in claim 19, wherein the instructions executed on the processor further cause the processor to:

determine one of the preset sentences as the matched sentence when the audio sentence of the audio data has more than half of the keywords of the preset sentence, and determine that a word in the audio sentence of the audio data which differs from each of the keywords as the replacement role.

21. The device as claimed in claim 15, wherein the instructions executed on the processor further cause the processor to:

when the user requests recording the audio data and more than one audio sentence of the audio data is matched with a preset sentence, record a first sentence which has a largest number of matched keywords among the audio sentences; and sort the first sentence according to a sequence of the corresponding matched preset sentence in the story.

* * * * *